United States Patent
Tamm et al.

(10) Patent No.: US 10,404,565 B2
(45) Date of Patent: Sep. 3, 2019

(54) SIMULATION LATENCY INDICATION

(71) Applicant: Ford Global Technologies, LLC, Dearborn, MI (US)

(72) Inventors: Brian Tamm, Pleasant Ridge, MI (US); Han Liu, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 93 days.

(21) Appl. No.: 15/840,259

(22) Filed: Dec. 13, 2017

(65) Prior Publication Data
US 2019/0182136 A1 Jun. 13, 2019

(51) Int. Cl.
| | |
|---|---|
| *G06F 17/50* | (2006.01) |
| *H04L 12/26* | (2006.01) |
| *B60W 30/08* | (2012.01) |
| *B60W 40/10* | (2012.01) |
| *H04N 7/18* | (2006.01) |
| *G06K 9/62* | (2006.01) |
| *G06K 9/00* | (2006.01) |

(52) U.S. Cl.
CPC ......... *H04L 43/0852* (2013.01); *B60W 30/08* (2013.01); *B60W 40/10* (2013.01); *G06K 9/00624* (2013.01); *G06K 9/6215* (2013.01)

(58) Field of Classification Search
CPC . G06F 17/50; G06F 17/5009; H04L 43/0852; B60W 30/08; B60W 40/10; H04N 7/18
See application file for complete search history.

(56) References Cited

U.S. PATENT DOCUMENTS

| | | | |
|---|---|---|---|
| 7,376,525 B2* | 5/2008 | Desailly | H02P 6/006 702/72 |
| 9,514,664 B2 | 12/2016 | Blanton et al. | |
| 2008/0310676 A1* | 12/2008 | Silver | G01V 8/00 382/103 |
| 2012/0281767 A1* | 11/2012 | Duenas | H04N 19/176 375/240.24 |
| 2014/0075030 A1* | 3/2014 | Wang | G06F 9/50 709/226 |

(Continued)

FOREIGN PATENT DOCUMENTS

| | | |
|---|---|---|
| CN | 105388021 A | 3/2016 |
| DE | 102004057947 B4 | 10/2009 |

OTHER PUBLICATIONS

Friston et al. article entitled "Measuring Latency in Virtual Environments," Manuscript received Sep. 12, 2013; accepted Jan. 10, 2014; posted online Mar. 29, 2014; dated May 1, 2014.

(Continued)

*Primary Examiner* — Tan Q Nguyen
(74) *Attorney, Agent, or Firm* — Frank A. MacKenzie; Bejin Bieneman PLC (57) ABSTRACT

A system includes a real-time computer having a real-time clock programmed to output a clock signal, a binary clock display programmed to display a first amount of time that has elapsed according to the clock signal, a host computer programmed to simulate a virtual environment including a virtual clock display programmed to represent a second amount of time that has elapsed according to the clock signal, and a latency processor programmed to calculate latency of the host computer based on a difference between the first amount of time and the second amount of time.

20 Claims, 3 Drawing Sheets

(56) References Cited

U.S. PATENT DOCUMENTS

2017/0146987 A1  5/2017  Ramakrishnan et al.

OTHER PUBLICATIONS

Blissing article entitled "Driving in Virtual Reality, Investigations in Effects of Latency and Level of Virtuality," Linköping Studies in Science and Technology Licentiate Thesis No. 1759, ISBN 978-91-7685-673-4, ISSN 0280-7971, Copyright Björn Missing, 2016, Printed in Sweden by LiU-Tryck, Linköping 2016.
Rossi et al. article entitled "Vehicle Hardware in the Loop System for ADAS Virtual Testing," Univ. Rouen, UNIROUEN, ESIGELEC, IRSEEM 76000 Rouen, France.

* cited by examiner

SIMULATION LATENCY INDICATION

BACKGROUND

Advanced driver assistance systems (ADAS) in vehicles use on-board vehicle sensors to provide assistance to the driver. ADAS features can include systems such as emergency braking (e.g., autonomous braking when the vehicle is too close to another vehicle), adaptive cruise control (e.g., autonomous accelerating and braking to maintain the distance between vehicles), and traffic jam assist (e.g., autonomously maintaining distances between vehicles in heavy traffic). The sensors used in ADAS can include cameras, radar, lidar, etc.

DETAILED DESCRIPTION

Virtual testing of advanced driver assistance system (ADAS) using a simulated virtual environment can reduce costs associated with real-world track testing. One type of system for simulating an ADAS environment includes a hardware-in-the-loop (HiL) testing system, which can be used to validate computer components, including electronic control units (ECUs), used to implement the ADAS feature.

An ADAS HiL simulation system can include a real-time computer for calculating a vehicle dynamics model in real time, a host computer for rendering a virtual environment, an ADAS controller (ECU) and sensors (such as a camera and radar, for instance) that implement the ADAS feature, and a display monitor for presenting the virtual environment and feed the virtual environment to the ADAS sensors 120. With this setup, latency can exist between the real-time computer and the host computer (i.e., in the virtual environment of the host computer). The latency, for example, can occur between the time the ECU outputs control signals and the time the virtual environment responds to the control signals output by the ECU. Another instance of latency can occur between the transmission of the video signal by the host computer to the actual pixel refresh of the display. The latency can cause issues with the simulation, and may be especially problematic when the vision sensor output is fused with the output of another sensor (e.g., radar) simulated on the real-time computer. Simply put, the latency can make it appear as though the ADAS controller is malfunctioning. Measuring and accounting for the latency can be used to determine if the ADAS controller is operating properly.

One way to measure latency between the real-time computer and the host computer is with a system that includes a real-time computer having a real-time clock programmed to output a clock signal, a binary clock display programmed to display a first amount of time that has elapsed according to the clock signal, a host computer programmed to simulate a virtual environment including a virtual clock display programmed to represent a second amount of time that has elapsed according to the clock signal, and a latency processor programmed to calculate latency of the host computer based on a difference between the first amount of time and the second amount of time.

In the system, the latency processor may be programmed to calculate the latency of the host computer by subtracting the second amount of time from the first amount of time.

The system may further include a camera configured to capture an image including the binary clock display and the virtual clock display. The latency processor may be programmed to receive the image and determine the first amount of time and the second amount of time from the image.

The binary clock display may include a plurality of light sources representing a binary string representing the first amount of time. The virtual clock display may include a plurality of virtual light sources representing a binary string representing the second amount of time. An illuminated light source may represent a binary one and a darkened light source may represent a binary zero. An illuminated virtual light source may represent a binary one and a darkened virtual light source may represent a binary zero.

The system may further include a monitor in communication with the host computer and programmed to display the simulation of the virtual environment and the virtual clock display.

The real-time computer may be programmed to calculate vehicle dynamics in real time. The system may further include a vehicle controller in communication with the real-time computer.

A method includes determining a first amount of time that has elapsed according to a clock signal output by a real-time computer, determining a second amount of time that has elapsed according to the clock signal output by the real-time computer on a host computer simulating a virtual environment, and calculating a latency of the host computer based on a difference between the first amount of time and the second amount of time.

Calculating the latency may include subtracting the second amount of time from the first amount of time.

Determining the first amount of time may include receiving an image of a binary clock display showing the first amount of time and processing the image to determine the first amount of time. The image may include a virtual clock display showing the second amount of time, and determining the second amount of time may include receiving the image of the virtual clock display and processing the image to determine the second amount of time.

The method may include receiving a frame with the image. In that instance, the method may include determining whether to process the frame.

The method may include displaying the simulation of the virtual environment and the virtual clock display on a monitor in communication with the host computer.

Another system includes a real-time computer programmed to calculate vehicle dynamics in real time, and the real-time computer having a real-time clock programmed to output a clock signal. The system further includes a vehicle controller in communication with the real-time computer, a binary clock display programmed to display a first amount of time that has elapsed according to the clock signal, a host computer programmed to simulate a virtual environment including a virtual clock display programmed to represent a second amount of time that has elapsed according to the clock signal, a monitor in communication with the host computer and programmed to display the simulation of the virtual environment and the virtual clock display, a camera configured to capture an image including the binary clock display and the virtual clock display, and a latency processor programmed to receive the image captured by the camera, determine the first amount of time and the second amount of time from the image, and calculate latency of the host computer based on a difference between the first amount of time and the second amount of time.

In the system, the latency processor may be programmed to calculate the latency of the host computer by subtracting the second amount of time from the first amount of time.

In the system, the binary clock display may include a plurality of light sources representing a binary string representing the first amount of time and the virtual clock display may include a plurality of virtual light sources 165 representing a binary string representing the second amount of time. An illuminated light source represents a binary one and a darkened light source represents a binary zero, and an illuminated virtual light source 165 represents a binary one and a darkened virtual light source 165 represents a binary zero.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
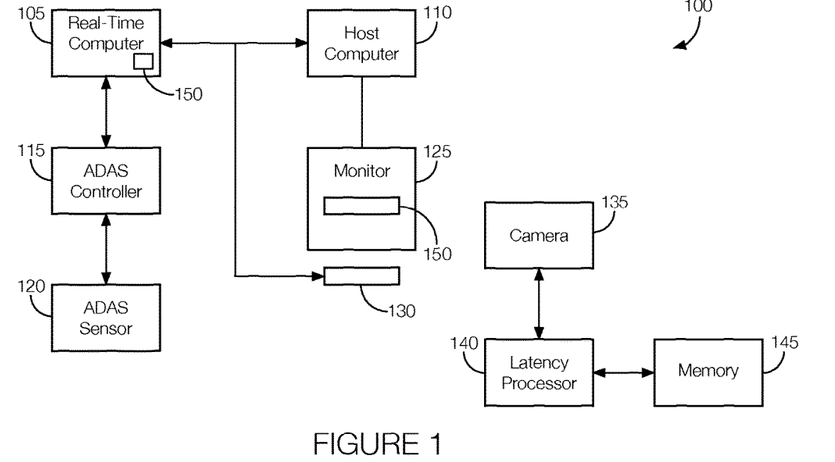
FIG. 1 illustrates a block diagram of a system for simulating an ADAS environment.

As illustrated in FIG. 1, the system 100 includes a real-time computer 105, a host computer 110, an ADAS controller 115, ADAS sensors 120, a monitor 125, a binary clock display 130, a camera 135, a latency processor 140, and memory 145.

The real-time computer 105 is implemented via circuits, chips, or other electronic components programmed to receive control signals output by the ADAS controller 115 and calculate vehicle dynamics in real time. The real-time computer 105 may include a clock 155 (referred to as a "real-time clock 155") with a clock signal output to the binary clock display 130 and to the host computer 110.

The host computer 110 is implemented via circuits, chips, or other electronic components programmed to render a virtual environment for testing the ADAS controller 115 and the ADAS sensors 120. Rendering the virtual environment may include outputting signals representing a driving environment with virtual representations of what the ADAS sensors 120 might detect. The virtual environment, therefore, may include virtual representations of e.g., a roadway, other vehicles, objects in the road, pedestrians, etc. The virtual environment may further include a virtual clock display 150. The output of the virtual clock display 150 may be based at least in part on the clock signal output by the real-time clock 155. Thus, the virtual clock display 150 and the binary clock display 130 may present time according to the same clock signal. For purposes of making comparisons between the virtual clock display 150 and the binary clock display 130 easier, the appearance of the virtual clock display 150 may be similar to that of the binary clock display 130. As discussed in greater detail below, the binary clock display 130 may include light sources 160 representing a binary string representing the amount of time that has elapsed since the simulation began. Rather than keep a global or absolute time, in the case of a rolling 8-bit counter, for instance, the binary string may represent the amount of time since the counter last rolled over. Therefore, the virtual clock display 150 may present virtual light sources 165 representing a binary string that represents the amount of time that has elapsed since the simulation began. In some instances, such as instances where the camera 135 has high resolution, the virtual light sources 165 may be very small, including as small as a single pixel of the monitor 125. In that instance, the virtual clock display 150 may be implemented as, e.g., a number of pixels (e.g., as few as 8 pixels) in a single row of pixels.

The ADAS controller 115 is implemented via circuits, chips, or other electronic components programmed to output control signals to carry out various autonomous operations such as emergency braking (e.g., autonomous braking when the vehicle is too close to another vehicle), adaptive cruise control (e.g., autonomous accelerating and braking to maintain the distance between vehicles), and traffic jam assist (e.g., autonomously maintaining distances between vehicles in heavy traffic). When used in an autonomous vehicle, the ADAS controller 115 may be incorporated into a virtual driver system, which is a computing platform, implemented via sensors, controllers, circuits, chips, and other electronic components, that control various autonomous operations of the autonomous vehicle. For instance, the ADAS controller 115 may be incorporated into an autonomous vehicle controller programmed to process the data captured by the ADAS sensors 120, which may include a lidar sensor, a radar sensor, a camera, ultrasonic sensors, etc. When incorporated into the autonomous vehicle, the autonomous vehicle controller outputs control signals to components of the automated vehicle platform to autonomously control the autonomous vehicle according to the data captured by the ADAS sensors 120. The automated vehicle platform refers to the components that carry out the autonomous vehicle operation upon instruction from the virtual driver system, and specifically, from the autonomous vehicle controller, the ADAS controller 115, or both. As such, the automated vehicle platform includes various actuators incorporated into the autonomous vehicle that control the steering, propulsion, and braking of the autonomous vehicle. The automated vehicle platform sometimes includes various platform controllers (sometimes referred to in the art as "modules"), such as a chassis controller, a powertrain controller, a body controller, an electrical controller, etc. During simulation testing, the ADAS controller 115 may remain disconnected from the automated vehicle platform, the autonomous vehicle controller, or both. Further, during the simulation, the ADAS controller 115 may be in communication with the real-time computer 105 via a communication network, such as a Controller Area Network (CAN) bus.

The ADAS sensors 120 are implemented via circuits, chips, or other electronic components programmed to capture data concerning objects presented in the virtual environment. Because the virtual environment is presented on a monitor 125, the ADAS sensor 120 used for simulation testing may be a camera since other types of ADAS sensors 120, such as lidar or ultrasonic sensors, may not be able to detect the objects shown on the monitor 125. The ADAS sensor 120 may output signals representing detected objects to the ADAS controller 115. In some instances, during the simulation, simulated outputs may be provided to the ADAS controller 115 rather than have an actual ADAS sensor 120 output signals to the ADAS controller 115.

The monitor 125 is implemented via circuits, chips, or other electronic components programmed to display the virtual environment in a way that allows the virtual environment to be detected by the ADAS sensor 120. Thus, if the ADAS sensor 120 is a camera, the monitor 125 may be a display screen (such as a computer monitor) that presents a visual representation of the virtual environment that can be detected by the camera.

The binary clock display 130 is implemented via light sources 160, circuits, chips, or other electronic components that can display a binary representation of the passage of time. The light sources 160 may be, e.g., light emitting diodes. In some instances, such as instances where the camera 135 has high resolution, the light sources 160 may be very small, including as small as a single pixel. In that instance, the binary clock display 130 may be implemented as, e.g., a single row of pixels. The light sources 160 may be located in a row, and each light source 160 may represent a digit in a binary string of digits. A controller incorporated into the binary clock display 130 may indicate which light sources 160 should be illuminated and which should be darkened. An illuminated light source 160 may indicate a binary one and a darkened light source 160 may indicate a binary zero. The binary string may represent a unit of time that has elapsed since the simulation began. If the unit of time is milliseconds, then every millisecond, the binary string may increment by one. In other words, the subset of light sources 160 that are illuminated and the subset of light sources 160 that are darkened may change every unit of time (e.g., every millisecond). The binary clock display 130 may mark time according to the output of the real-time clock 155. That is, the controller may act in accordance with the output of the real-time clock 155. This could mean incrementing the time shown via the binary clock display 130 at each rising edge or at each falling edge of the signal output by the real-time clock 155. The controller may be programmed to observe a certain number of rising or falling edges to determine that a unit of time has elapsed. When the real-time clock 155 output reflects that the unit of time has elapsed, the binary clock display 130 may change the subset of illuminated light sources 160 and the subset of darkened light sources 160 to reflect that another unit of time has passed.

The camera 135 is a vision sensor with circuits, chips, or other electronic components that captures images of the monitor 125 and the binary clock display 130. To capture such images, the camera 135 may include a lens that projects light toward, e.g., a CCD image sensor, a CMOS image sensor, etc. The camera 135 processes the light and generates digital representations of the captured images. The individual images may be frames in a video captured by the camera 135. The image may be output to the latency processor 140 and, as discussed in greater detail below, can be used to detect latency between the real-time computer 105 and the host computer 110.

The latency processor 140 is implemented via circuits, chips, or other electronic components programmed to measure the latency between the real-time computer 105 and the host computer 110. The latency processor 140 may include one or more microcontrollers, one or more field programmable gate arrays (FPGAs), one or more application specific integrated circuits (ASICs), one or more digital signal processors (DSPs), one or more customer specific integrated circuits, etc.

The latency processor 140 may be programmed to compare the times shown on the binary clock display 130 and the virtual clock display 150 at a particular frame. That is, the latency processor 140 may be programmed to find the difference in the time represented on the binary clock display 130 and the virtual clock display 150 at a particular frame. That difference represents the latency, i.e., the amount of time by which the virtual environment differs from that of the real-time computer 105. Because the binary clock display 130 and the virtual clock display 150 are both marking time from the same source (e.g., the real-time clock 155), and because the virtual clock display 150 is further a result of the processing of the host computer 110, the time difference determined by the latency processor 140 represents the latency of the host computer 110. With the latency known, certain delays, including static delays that may affect the operation of the simulation, can be mitigated.

The latency processor 140 may be programmed to calculate the latency by subtracting the time shown on the binary clock display 130 from the time shown via the virtual clock display 150. The latency processor 140 may be programmed to subtract the value represented by the bits (e.g., the illuminated virtual light sources 165) of the virtual clock display 150 from the value represented by the bits (e.g., the illuminated light sources 160) of the binary clock display 130. The latency processor 140 may be programmed to record the latency at each frame tested by storing the latency in, e.g., the memory 145. In some instances, the latency processor 140 may be programmed to output the latency to a display device 170 of a computer, which may be the real-time computer 105 or the host computer 110 or may be different from the real-time computer 105 and the host computer 110. The output of the latency processor 140 may indicate the latency of the host computer 110. The output of the latency processor 140 may further indicate, for each frame processed, the time of the binary clock display 130, the time of the virtual clock display 150, an indicator of the bits (light sources 160) illuminated on the binary clock display 130, an indicator of the bits (light sources 160) darkened on the binary clock display 130, an indicator of the bits (virtual light sources 165) illuminated on the virtual clock display 150, an indicator of the bits (virtual light sources 165) darkened on the virtual clock display 150, the amount of time the simulation has been running, or the like.

Memory 145 may be incorporated into or otherwise accessible to the components shown in FIG. 1. The memory 145 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 145 may store data and instructions executable by the latency processor 140, the real-time computer 105, the host computer 110, the ADAS controller 115, etc. Only one memory 145 is shown in FIG. 1 for purposes of simplicity. The memory 145 shown is in communication with the latency processor 140. The other memories may be in communication with or incorporated into, e.g., the real-time computer 105, the host computer 110, the ADAS controller 115, etc. Further, although shown as separate, the memory 145 of the latency processor 140 may be incorporated into the latency processor 140.

Figure 2:
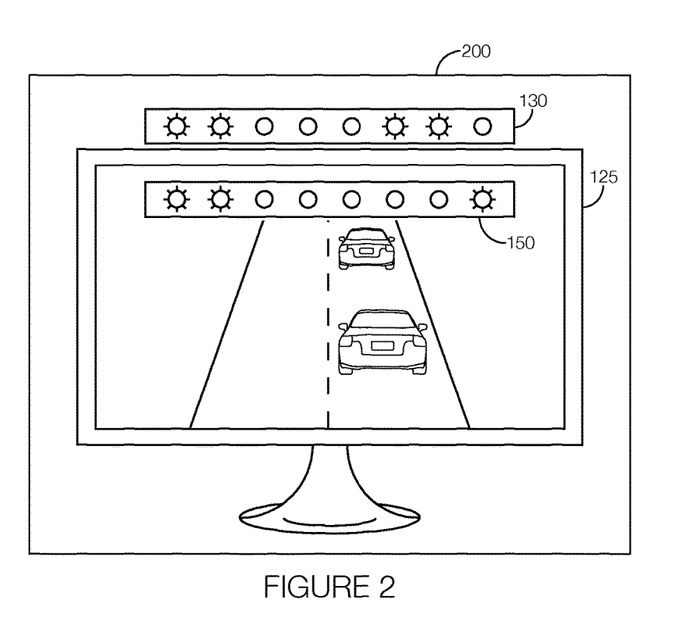
FIG. 2 illustrates a view from a camera used in the system of FIG. 1.

FIG. 2 illustrates an example view from the camera 135. Specifically, FIG. 2 represents one possible frame 200 that may be captured by the camera 135 showing the time difference between the binary clock display 130 and the virtual clock display 150. The light sources 160 of the binary clock display 130 and the virtual light sources 165 of the virtual clock display 150 represent the passage of time in binary. In the example of FIG. 2, the least significant bit of the binary clock display 130 and the virtual clock display 150 represents 10 milliseconds. Thus, in FIG. 2, the binary clock display 130 ("11000110") shows that 1980 milliseconds have elapsed while the virtual clock display 150 ("11000001") shows that 1930 milliseconds have elapsed. As discussed above, the difference between those values represents the latency of the host computer 110. Thus, in the example of FIG. 2, the latency of the host computer 110 is 50 milliseconds. The latency processor 140 may be programmed to determine this latency by subtracting the virtual clock display 150 ("11000001") from the binary clock display 130 ("11000110").

Figure 3:
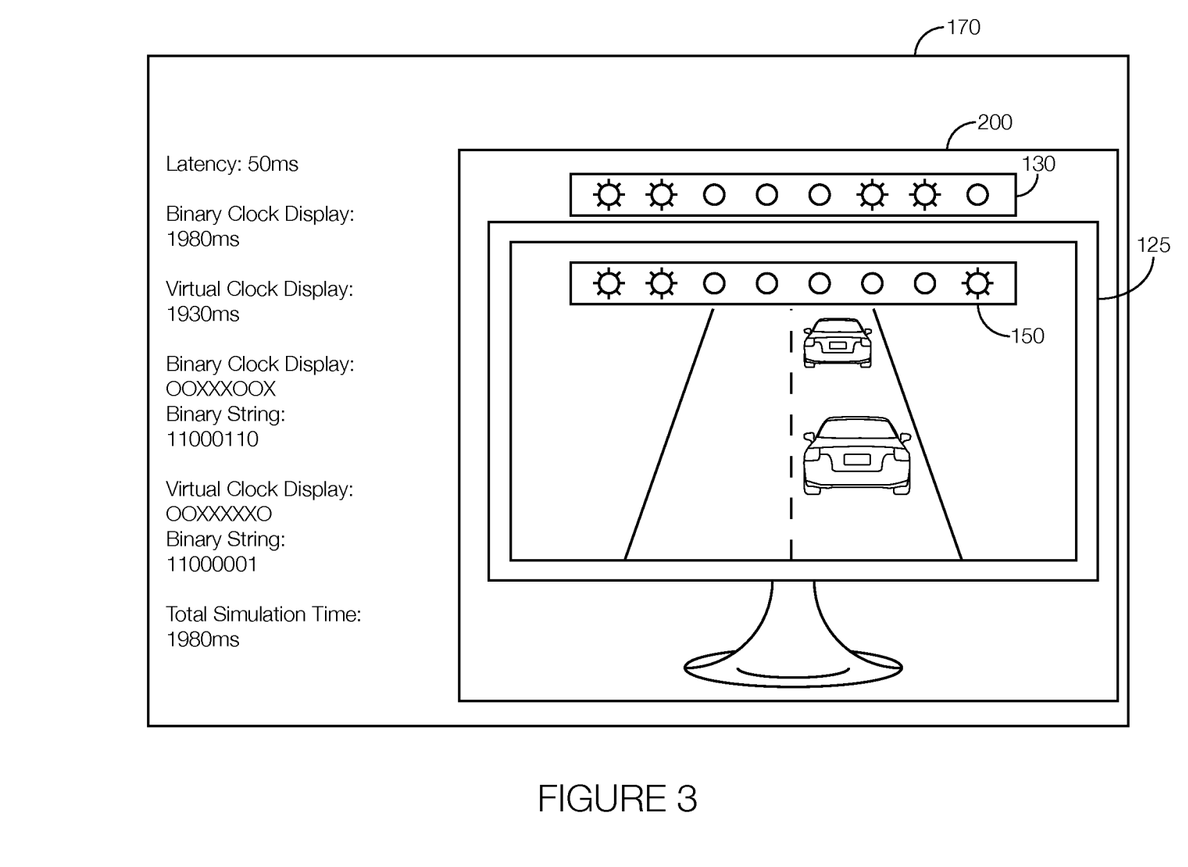
FIG. 3 illustrates an example output of the latency processor.

FIG. 3 illustrates an example output of the latency processor 140 used in the example of FIG. 2. As previously explained, the latency processor 140 may be programmed to output the latency to a display device 170 of a computer separate from the real-time computer 105 and the host computer 110. Continuing with the example of FIG. 2, the output of the latency processor 140 may represent the calculated latency (50 milliseconds) of the host computer 110. The output of the latency processor 140 may further indicate, for the frame shown in FIG. 2, the time of the binary clock display 130 (1980 milliseconds), the time of the virtual clock display 150 (1930 milliseconds), an indicator of the bits (light sources 160) illuminated on the binary clock display 130 and an indicator of the bits (light sources 160) darkened on the binary clock display 130 (e.g., "OOXXXOOX" where "O" indicates that the light source 160 is illuminated and "X" indicates that the light source 160 is darkened), and an indicator of the bits (virtual light sources 165) illuminated on the virtual clock display 150 and the bits (virtual light sources 165) darkened on the virtual clock display 150 (e.g., "OOXXXXXO" where "O" indicates that the virtual light source 165 160 is illuminated and "X" indicates that the virtual light source 165 160 is darkened). The output of the latency processor 140 may be updated periodically. If the latency is calculated for every frame captured by the camera 135, the output of the processor may be updated at every frame. If the latency is not calculated for every frame captured by the camera 135, the output of the latency processor 140 may be updated at every frame for which a latency is calculated.

Figure 4:
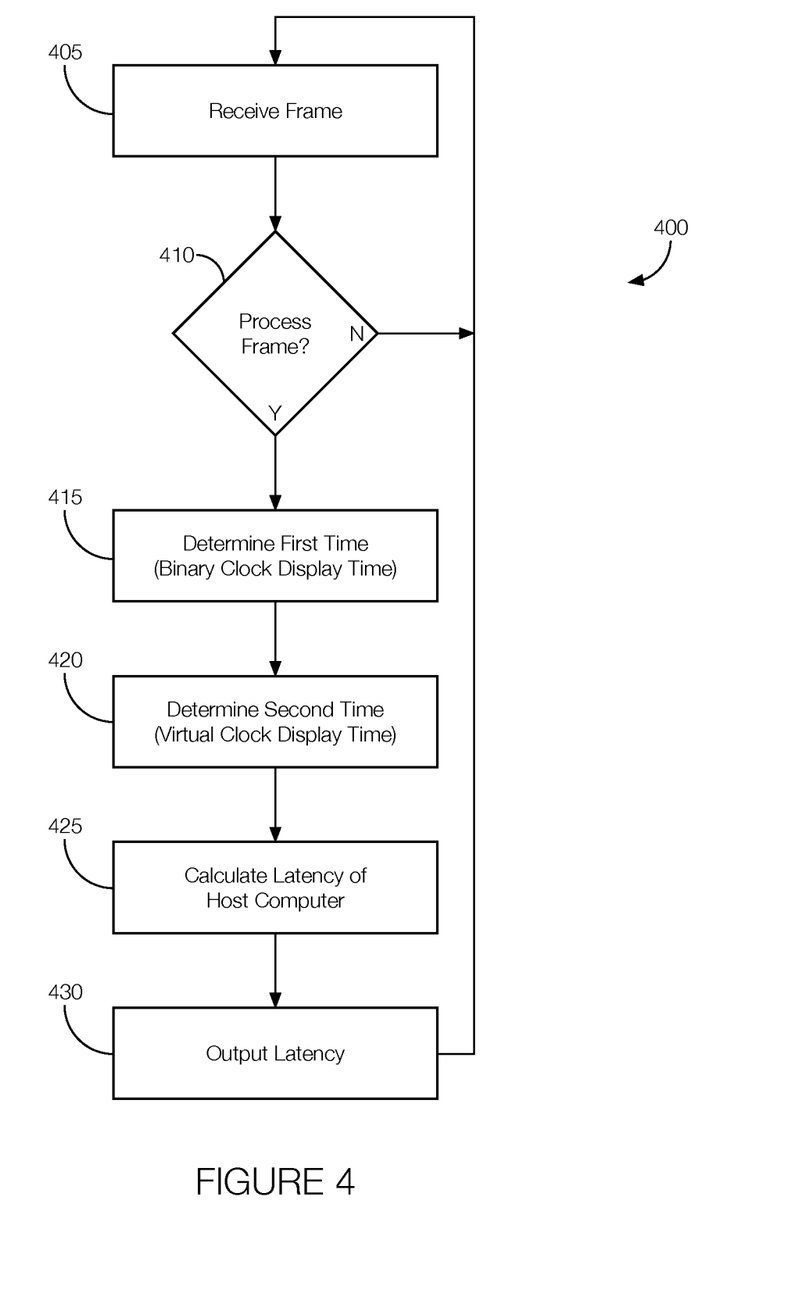
FIG. 4 is a flowchart of an example process that may be executed by a latency processor to detect latency in the simulation of the ADAS environment.

FIG. 4 illustrates an example process 400 that may be executed by the latency processor 140. The process 400 may begin any time the host computer 110 is simulating the virtual environment and presenting the virtual environment, including the virtual clock display 150, on the monitor 125.

At block 405, the latency processor 140 receives a frame. The frame may be captured by the camera 135 and output to the latency processor 140. The frame may be a single image that shows the binary clock display 130 and the virtual clock display 150, including the light sources 160 and virtual light sources 165, respectively.

At decision block 410, the latency processor 140 determines whether to process the frame. In some instances, the latency processor 140 may be programmed to process every frame, in which case the result of decision block 410 will always be in the affirmative. The latency processor 140 need not process every frame, however, and reducing the number of processed frames may reduce the processing power needed to perform the process 400 while still allowing the latency processor 140 to adequately determine the latency of the host computer 110. Whether the latency processor 140 determines to process a frame may be based on, e.g., a count of the number of frames since the last time a frame was processed. For instance, a negative result at decision block 410 may increment a count representing the number of frames that have been passed to the latency processor 140 since the last frame was processed. The count may be reset following an affirmative result at decision block 410. Further, in that scenario, the latency processor 140 may be programmed to compare the count to a threshold to determine whether to process the frame. If the count is equal to or greater than the threshold, the count may be reset and the process 400 may proceed to block 415. Otherwise, the count may be incremented and the process 400 may return to block 405 to await the next frame. Thus, in one example, if the latency processor 140 is to process every third frame, the threshold may be set to three so the process 400 may proceed to block 415 when the count is equal to three, assuming the count is incremented by one at every negative result of decision block 410.

At block 415, the latency processor 140 determines the time of the binary clock display 130. This amount of time may be referred to as the "first" amount of time. The latency processor 140 may be programmed to perform an image processing technique on the frame received at block 405 and identify the binary clock display 130 as a result of the image processing technique. The latency processor 140 may identify the binary clock display 130 based on, e.g., its location in the frame, the color of the light sources 160 (which may be different from the color of the virtual light sources 165 of the virtual clock display 150), etc. The latency processor 140 may use the locations of the illuminated and darkened light sources 160 to determine the time shown on the binary clock display 130.

At block 420, the latency processor 140 determines the time of the virtual clock display 150. This amount of time may be referred to as the "second" amount of time. The latency processor 140 may be programmed to perform an image processing technique on the frame received at block 405 and identify the virtual clock display 150 as a result of the image processing technique. The latency processor 140 may identify the virtual clock display 150 based on, e.g., its location in the frame, the color of the virtual light sources 165 (which may be different from the color of the light sources 160 of the binary clock display 130), etc. The latency processor 140 may use the locations of the illuminated and darkened virtual light sources 165 to determine the time shown on the virtual clock display 150.

At block 425, the latency processor 140 calculates the latency. That is, the latency processor 140 may subtract the time shown on the virtual clock display 150 determined at block 420 (the "second amount of time") from the time shown on the binary clock display 130 determined at block 415 (the "first amount of time"). The difference, as discussed above, may represent the latency of the host computer 110.

At block 430, the latency processor 140 outputs the latency. The latency processor 140 may store the latency in the memory 145 so that it may be recorded for further analysis. In some instances, the latency processor 140 may output the latency to a display device 170 of a computer, which may be the real-time computer 105 or the host computer 110 or may be different from the real-time computer 105 and the host computer 110. The output of the latency processor 140 may indicate the latency of the host computer 110 determined at block 425. The output of the latency processor 140 may further indicate, for each frame processed, the time of the binary clock display 130, the time of the virtual clock display 150, an indicator of the bits (light sources 160) illuminated on the binary clock display 130, an indicator of the bits (light sources 160) darkened on the binary clock display 130, an indicator of the bits (virtual light sources 165) illuminated on the virtual clock display 150, an indicator of the bits (virtual light sources 165) darkened on the virtual clock display 150, the amount of time the simulation has been running, or the like. The process 400 may return to block 405 from block 430.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
 a real-time computer having a real-time clock programmed to output a clock signal;

a binary clock display programmed to display a first amount of time that has elapsed according to the clock signal;

a host computer programmed to simulate a virtual environment including a virtual clock display programmed to represent a second amount of time that has elapsed according to the clock signal; and a latency processor programmed to calculate latency of the host computer based on a difference between the first amount of time and the second amount of time.

2. The system of claim 1, wherein the latency processor is programmed to calculate the latency of the host computer by subtracting the second amount of time from the first amount of time.

3. The system of claim 1, further comprising a camera configured to capture an image including the binary clock display and the virtual clock display.

4. The system of claim 3, wherein the latency processor is programmed to receive the image and determine the first amount of time and the second amount of time from the image.

5. The system of claim 1, wherein the binary clock display includes a plurality of light sources representing a binary string representing the first amount of time.

6. The system of claim 5, wherein the virtual clock display includes a plurality of virtual light sources representing a binary string representing the second amount of time.

7. The system of claim 6, wherein an illuminated light source represents a binary one and a darkened light source represents a binary zero, and wherein an illuminated virtual light source represents a binary one and a darkened virtual light source represents a binary zero.

8. The system of claim 1, further comprising a monitor in communication with the host computer and programmed to display the simulation of the virtual environment and the virtual clock display.

9. The system of claim 1, wherein the real-time computer is programmed to calculate vehicle dynamics in real time.

10. The system of claim 9, further comprising a vehicle controller in communication with the real-time computer.

11. A method comprising:

determining a first amount of time that has elapsed according to a clock signal output by a real-time computer;

determining a second amount of time that has elapsed according to the clock signal output by the real-time computer on a host computer simulating a virtual environment; and calculating a latency of the host computer based on a difference between the first amount of time and the second amount of time.

12. The method of claim 11, wherein calculating the latency includes subtracting the second amount of time from the first amount of time.

13. The method of claim 11, wherein determining the first amount of time includes receiving an image of a binary clock display showing the first amount of time and processing the image to determine the first amount of time.

14. The method of claim 13, wherein the image further includes a virtual clock display showing the second amount of time and wherein determining the second amount of time includes receiving the image of the virtual clock display and processing the image to determine the second amount of time.

15. The method of claim 13, further comprising receiving a frame with the image.

16. The method of claim 15, further comprising determining whether to process the frame.

17. The method of claim 11, further comprising displaying the simulation of the virtual environment and the virtual clock display on a monitor in communication with the host computer.

18. A system comprising:

a real-time computer programmed to calculate vehicle dynamics in real time, the real-time computer having a real-time clock programmed to output a clock signal;

a vehicle controller in communication with the real-time computer;

a binary clock display programmed to display a first amount of time that has elapsed according to the clock signal;

a host computer programmed to simulate a virtual environment including a virtual clock display programmed to represent a second amount of time that has elapsed according to the clock signal;

a monitor in communication with the host computer and programmed to display the simulation of the virtual environment and the virtual clock display;

a camera configured to capture an image including the binary clock display and the virtual clock display; and a latency processor programmed to receive the image captured by the camera, determine the first amount of time and the second amount of time from the image, and calculate latency of the host computer based on a difference between the first amount of time and the second amount of time.

19. The system of claim 18, wherein the latency processor is programmed to calculate the latency of the host computer by subtracting the second amount of time from the first amount of time.

20. The system of claim 18, wherein the binary clock display includes a plurality of light sources representing a binary string representing the first amount of time, wherein the virtual clock display includes a plurality of virtual light sources representing a binary string representing the second amount of time, wherein an illuminated light source represents a binary one and a darkened light source represents a binary zero, and wherein an illuminated virtual light source represents a binary one and a darkened virtual light source represents a binary zero.

* * * * *